(12) United States Patent
Celestini

(10) Patent No.: US 10,963,994 B2
(45) Date of Patent: Mar. 30, 2021

(54) SYSTEMS, METHODS, AND STORAGE MEDIA FOR ANONYMIZING AT LEAST ONE FEATURE IN A SCENE

(71) Applicant: Stefano Celestini, Oakville (CA)

(72) Inventor: Stefano Celestini, Oakville (CA)

(73) Assignee: PACEFACTORY INC., Oakville (CA)

( * ) Notice: Subject to any disclaimer, the term of this patent is extended or adjusted under 35 U.S.C. 154(b) by 154 days.

(21) Appl. No.: 16/512,199

(22) Filed: Jul. 15, 2019

(65) Prior Publication Data

US 2020/0027200 A1    Jan. 23, 2020

Related U.S. Application Data

(60) Provisional application No. 62/701,351, filed on Jul. 20, 2018.

(51) Int. Cl.
| | | |
|---|---|---|
| G06T 5/00 | (2006.01) | |
| G06T 5/20 | (2006.01) | |
| G06K 9/62 | (2006.01) | |
| G06K 9/46 | (2006.01) | |
| G06T 7/246 | (2017.01) | |

(52) U.S. Cl.
CPC ............ *G06T 5/003* (2013.01); *G06K 9/46* (2013.01); *G06K 9/6267* (2013.01); *G06T 5/20* (2013.01); *G06T 7/246* (2017.01)

(58) Field of Classification Search
CPC .......... G06K 9/00228; G06K 9/00771; G06K 9/3233; G06K 9/46; G06K 9/6267; G06T 11/00; G06T 5/003; G06T 5/005; G06T 5/20; G06T 7/246
See application file for complete search history.

(56) References Cited

U.S. PATENT DOCUMENTS

| | | | | |
|---|---|---|---|---|
| 2014/0347475 | A1* | 11/2014 | Divakaran | G06K 9/00771 348/135 |
| 2016/0127641 | A1* | 5/2016 | Gove | G01B 11/00 348/143 |

* cited by examiner

*Primary Examiner* — Manuchehr Rahmjoo
(74) *Attorney, Agent, or Firm* — Steven M. Greenberg, Esq.; Shutts & Bowen LLP

(57) ABSTRACT

A computer-implemented method of anonymizing at least one feature in a scene comprises receiving one or more images representing the scene and applying a sorting algorithm to the image(s) to identify features within the image(s) and classify the features according to at least one predetermined feature category to produce at least one classified feature in the image(s). An annotation scheme, specifying at least one obscuring annotation type to be applied to at least one corresponding feature category, is applied to the image(s). The image(s) are then modified by, for each classified feature in the image(s) having an annotation indicating that said classified feature is in a feature category corresponding to a particular obscuring annotation type to be applied, applying the particular obscuring annotation type to that classified feature in the image(s) so that at least one identifying aspect of that classified feature is obscured within the image(s).

9 Claims, 5 Drawing Sheets

SYSTEMS, METHODS, AND STORAGE MEDIA FOR ANONYMIZING AT LEAST ONE FEATURE IN A SCENE

CROSS-REFERENCE TO RELATED APPLICATION

This application claims priority to U.S. Provisional Application No. 62/701,351 filed on Jul. 20, 2018, the teachings of which are hereby incorporated by reference.

TECHNICAL FIELD

The present disclosure relates to for anonymizing at least one feature in a scene.

BACKGROUND

With video and/or photo surveillance or monitoring, the typical purpose is to capture an event and use this information to visually identify an individual doing something that they should not be doing (e.g. a violation of law, organizational policy or safety rules).

Some such imagery may be used for coaching and training rather than for discipline, by providing examples to illustrate a topic using informative annotations that are relevant to the teaching. For example, imagery showing a safety violation and/or imagery showing proper safety procedures may be used as part of a safety training program. Typically one or more identifying features are anonymized (e.g. masked or removed) in the imagery. The features that are anonymized may be features that allow human individuals to be identified (e.g. faces) but are not limited to such features (e.g. features identifying a company, a brand or a location may also be anonymized). Anonymization is advantageous not only to protect the privacy of those involved in the imagery but also because the use of anonymous visuals may cause people to feel less threatened and more relaxed, which may facilitate learning. However, such anonymization is a time-consuming manual process.

SUMMARY

One aspect of the present disclosure relates to a method for anonymizing at least one feature in a scene. The method may include receiving at least one image representing the scene. The method may include applying a sorting algorithm to the at least one image to identify features within the image and classify the features according to at least one predetermined feature category to produce at least one classified feature in the at least one image. The method may include applying annotations to the at least one image by applying to the image an annotation scheme specifying at least one obscuring annotation type to be applied to at least one corresponding feature category. The method may include modifying the at least one image by, for each classified feature in the at least one image having an annotation indicating that the classified feature is in a feature category corresponding to a particular obscuring annotation type to be applied, applying the particular obscuring annotation type to that classified feature in the at least one image so that at least one identifying aspect of that classified feature is obscured within the at least one image.

Another aspect of the present disclosure relates to a system configured for anonymizing at least one feature in a scene in accordance with the above-described method. The system may include one or more hardware processors configured by machine-readable instructions. The processor(s) may be configured to receive at least one image representing the scene. The processor(s) may be configured to apply a sorting algorithm to the at least one image to identify features within the image and classify the features according to at least one predetermined feature category to produce at least one classified feature in the at least one image. The processor(s) may be configured to apply annotations to the at least one image by applying to the image an annotation scheme specifying at least one obscuring annotation type to be applied to at least one corresponding feature category. The processor(s) may be configured to modify the at least one image by, for each classified feature in the at least one image having an annotation indicating that the classified feature is in a feature category corresponding to particular obscuring annotation type to be applied, applying the particular obscuring annotation type to that classified feature in the at least one image so that at least one identifying aspect of that classified feature is obscured within the at least one image.

Yet another aspect of the present disclosure relates to a non-transient computer-readable storage medium having instructions embodied thereon, the instructions being executable by one or more processors to perform a method for anonymizing at least one feature in a scene as described above. The method may include receiving at least one image representing the scene. The method may include applying a sorting algorithm to the at least one image to identify features within the image and classify the features according to at least one predetermined feature category to produce at least one classified feature in the at least one image. The method may include applying annotations to the at least one image by applying to the image an annotation scheme specifying at least one obscuring annotation type to be applied to at least one corresponding feature category. The method may include modifying the at least one image by, for each classified feature in the at least one image having an annotation indicating that the classified feature is in a feature category corresponding to particular obscuring annotation type to be applied, applying the particular obscuring annotation type to that classified feature in the at least one image so that at least one identifying aspect of that classified feature is obscured within the at least one image.

In some implementations of the method, the at least one image may be a sequential series of images.

In some implementations of the method, it may include applying image preprocessing to the series of images before applying the sorting algorithm before, and the sorting algorithm is applied to the series of images after preprocessing the series of images. Applying image preprocessing to the series of images may include applying image stabilization to the series of images.

In some implementations of the method, applying image stabilization to the series of images may comprise identifying a common marker between image frames, tracking relative positions between the image frames to generate frame tracking information, and using the frame tracking information to adjust frame orientation for the series of images to correct for movement, angle and scale to create a consistent scene across the series of images. Applying image preprocessing to the series of images may further include calibrating the consistent scene by mapping distorted reference frames in the series of images to a common image frame and correcting image distortion within the common image frame to create a common viewpoint across the series of images.

In some implementations of the method, it may include filtering the series of images before applying the sorting algorithm, with the sorting algorithm being applied to the series of images after filtering the series of images.

In some implementations of the method, filtering the series of images may include one or more of adjusting an intensity threshold for the at least one image, adjusting a minimum size threshold for the at least one image, adjusting a maximum size threshold for the at least one image, blurring the at least one image and/or averaging features across a plurality of images.

In some implementations of the method, applying a sorting algorithm to the at least one image to identify features within the image may include one or more of sorting by line crossing, sorting by entering a target zone, sorting by exiting a target zone, sorting by size, sorting by symbol, sorting by aspect ratio, sorting by shape, sorting by color, sorting by texture, sorting by duration, sorting by speed, sorting by severity and/or sorting by comparison to pre-existing examples.

In some implementations of the method, modifying the at least one image by applying the particular obscuring annotation type may include one or more of applying a morphological operation, applying a colour change, applying a size change, applying a blur, applying pixilation, applying a pattern, applying a label that is at least one of speed, size or type, applying a motion trail, applying a heat map, removing the feature, and/or making the feature invisible.

In some implementations of the method, the at least one feature category may include an entire human individual, at least a portion of a face of a human individual, text matter, a location identifier, a brand identifier, an asset identifier and/or include private information.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
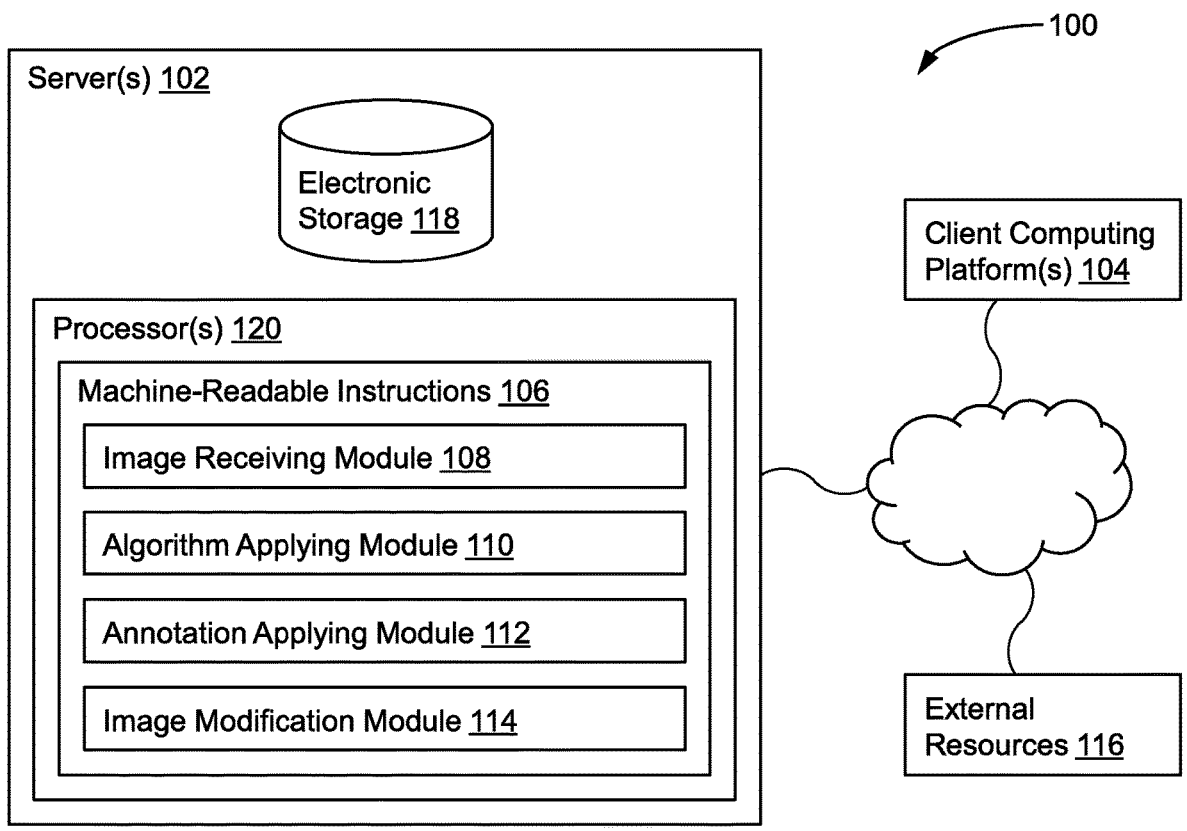
FIG. 1 illustrates a system configured for anonymizing at least one feature in a scene, in accordance with one or more implementations.

FIG. 1 illustrates a system 100 configured for anonymizing at least one feature in a scene, in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction modules. The instruction modules may include computer program modules. The instruction modules may include one or more of an image receiving module 108, a sorting module 110, an annotating module 112, an image modification module 114, and/or other instruction modules.

Image receiving module 108 may be configured to receive at least one image representing the scene. The at least one image may be a sequential series of images, for example a video or a stop-motion series.

Sorting module 110 may be configured to apply a sorting algorithm to the at least one image to identify features within the image and classify the features according to at least one predetermined feature category to produce at least one classified feature in the at least one image. The sorting algorithm may be applied to the series of images after pre-processing the series of images. The sorting algorithm may be applied to the series of images after filtering the series of images.

Annotating module 112 may be configured to apply annotations to the at least one image by applying to the image an annotation scheme specifying at least one obscuring annotation type to be applied to at least one corresponding feature category.

Image modification module 114 may be configured to modify the at least one image by, for each classified feature in the at least one image having an annotation indicating that the classified feature is in a feature category corresponding to particular obscuring annotation type to be applied, applying the particular obscuring annotation type to that classified feature in the at least one image so that at least one identifying aspect of that classified feature is obscured within the at least one image.

In some implementations, server(s) 102, client computing platform(s) 104, and/or external resources 116 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 116 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 116, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a smartphone, a gaming console, and/or other computing platforms.

External resources 116 may include sources of information outside of system 100, external entities participating with system 100, and/or other resources.

Server(s) 102 may include electronic storage 118, one or more processors 120, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 118 may comprise non-transitory storage media that electronically stores information. The electronic storage media of electronic storage 118 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 118 may include one or more virtual storage resources (e.g., cloud storage, a virtual private network, and/or other virtual storage resources). Electronic storage 118 may store software algorithms, information determined by processor(s) 120, information received from server(s) 102, information received from client computing platform(s) 104, and/or other information that enables server(s) 102 to function as described herein.

Processor(s) 120 may be configured to provide information processing capabilities in server(s) 102. As such, processor(s) 120 may include one or more of a digital processor, an analog processor, a digital circuit designed to process information, an analog circuit designed to process information, a state machine, and/or other mechanisms for electronically processing information. Although processor(s) 120 is shown in FIG. 1 as a single entity, this is for illustrative purposes only. In some implementations, processor(s) 120 may include a plurality of processing units. These processing units may be physically located within the same device, or processor(s) 120 may represent processing functionality of a plurality of devices operating in coordination. Processor(s) 120 may be configured to execute modules 108, 110, 112, and/or 114, and/or other modules. Processor(s) 120 may be configured to execute modules 108, 110, 112, and/or 114, and/or other modules by software; hardware; firmware; some combination of software, hardware, and/or firmware; and/or other mechanisms for configuring processing capabilities on processor(s) 120. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 108, 110, 112, and/or 114 are illustrated in FIG. 1 as being implemented within a single processing unit, in implementations in which processor(s) 120 includes multiple processing units, one or more of modules 108, 110, 112, and/or 114 may be implemented remotely from the other modules. The description of the functionality provided by the different modules 108, 110, 112, and/or 114 described below is for illustrative purposes, and is not intended to be limiting, as any of modules 108, 110, 112, and/or 114 may provide more or less functionality than is described. For example, one or more of modules 108, 110, 112, and/or 114 may be eliminated, and some or all of its functionality may be provided by other ones of modules 108, 110, 112, and/or 114. As another example, processor(s) 120 may be configured to execute one or more additional modules that may perform some or all of the functionality attributed below to one of modules 108, 110, 112, and/or 114.

Figure 2:
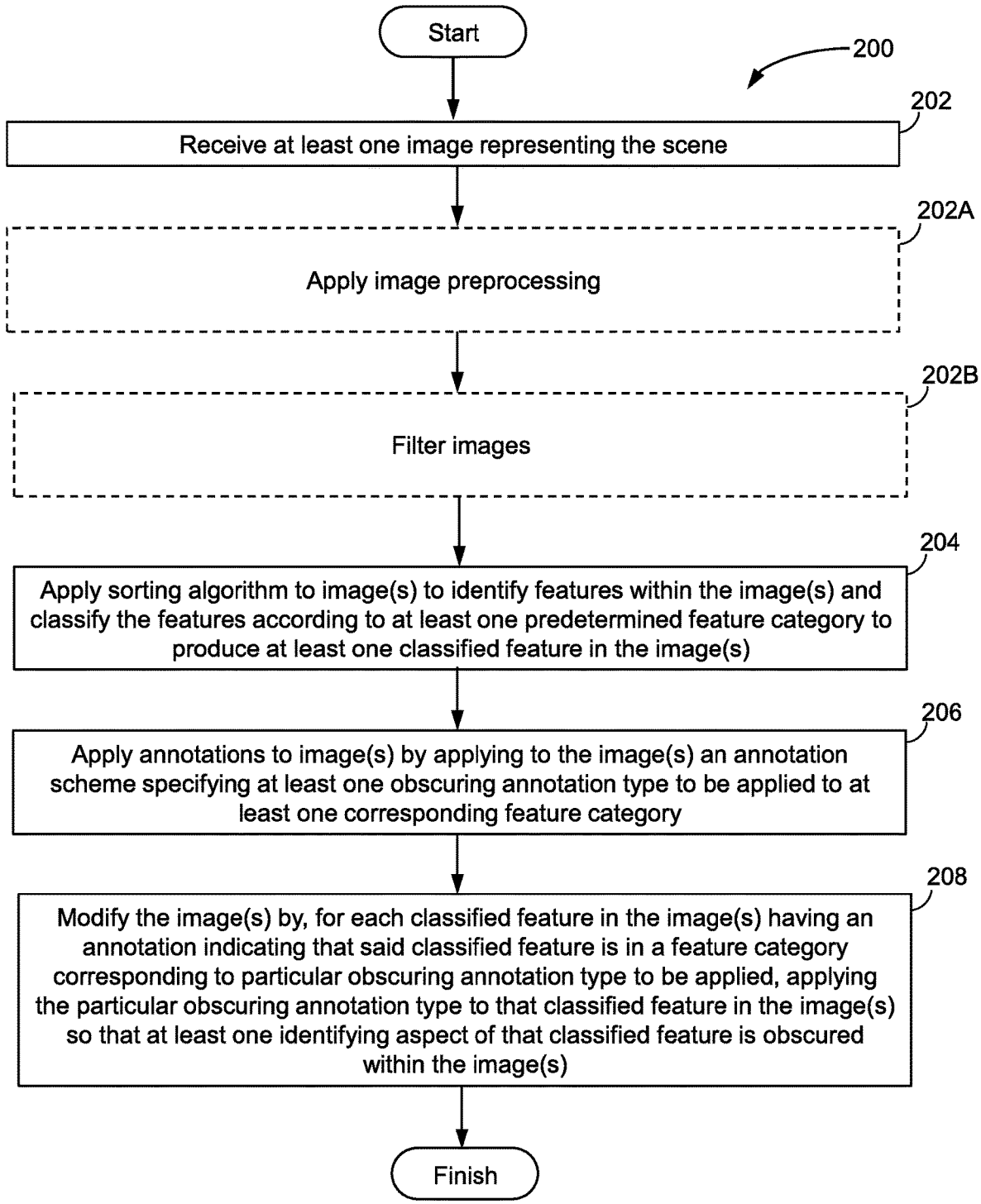
FIG. 2 illustrates a method for anonymizing at least one feature in a scene, in accordance with one or more implementations.

Reference is now made to FIG. 2, which is a flow chart illustrating an exemplary method 200 of anonymizing at least one feature in a scene. At step 202, the method comprises receiving at least one image representing the scene. The image may be a single image, or sequential series of images, such as a video or a stop-motion series. The scene represented in the image(s) may be, for example, all or part of a production area (e.g. in a factory), a warehouse, a shipping/receiving area, an outdoor storage yard, a construction site, a parking area, a site of a special event (e.g. a carnival or festival), or may be from a pre-existing source (e.g. news footage). Any single image or series of images, representing any scene for which one or more features are to be anonymized, may be used. For video (an example of a series of images), the VideoCapture class from OpenCV (Open Source Computer Vision) available at https://docs.opencv.org/3.1.0/d8/dfe/classcv_1_1VideoCapture.html, which is incorporated by reference herein, may be used. For an individual image, the image file reading and writing code from OpenCV (Open Source Computer Vision) may be used, this code is available at https://docs.opencv.org/3.1.0/d4/da8/group_imgcodecs.html, which is incorporated by reference herein. Another source for reading images may be found at https://docs.opencv.org/3.0-beta/modules/imgcodecs/doc/reading_and_writing_images.html#imread, also incorporated herein by reference. Optionally, the image(s) may be received from a camera or set of cameras that are integrated with the computing system executing the method 200.

Where a series of images is received, before applying the sorting algorithm at step 204, at optional step 202A the method 200 applies image preprocessing to the series of images, and at optional step 202B the method 200 filters the series of images. Thus, the sorting algorithm is applied to the series of images at step 204 after pre-processing the series of images at optional step 202A and/or filtering the series of images at step 202B. Filtering the series of images at step 202B may comprise, for example, adjusting an intensity threshold for the images, adjusting a minimum size threshold for images, adjusting a maximum size threshold for the images, blurring the images, summing differences and/or averaging features across a plurality of images.

An intensity threshold can be used to ignore or filter out regions of an image that are not bright enough. For example, an intensity threshold may specify that any regions that are below 30% of the maximum image brightness are to be ignored. The image itself does not need to be photographic. It may be an already processed image, such that brightness corresponds to the amount of motion in a given region. In this case, an intensity threshold would have the effect of filtering out regions based on the amount of motion.

A minimum size threshold could be applied while looking for shapes in an image. If a shape is found, it can be checked against a threshold to decide if it is 'big enough' to be considered a valid object. For example, a minimum size threshold could specify that any object that is less than 20 pixels wide is ignored. This allows the software to ignore/avoid keeping track of objects which are too small to be relevant (e.g. a falling leaf) or caused by video artifacts/distortions which tend to affect only a few pixels at a time.

Similarly to the minimum size threshold, a maximum size threshold can be used to ignore objects which are too big. For example, a maximum size threshold may specify that any object that is more than 800 pixels wide is ignored. Overly large detected objects may be caused by something unexpectedly blocking large parts of the camera view (e.g. an operator adjusting the camera). More commonly this is caused by dramatic changes in scene lighting which may confuse the software into interpreting the differently lit scene as an entirely new object. A maximum size threshold can help avoid/ignore these misdetections.

Blurring may be used to increase the effect of hiding identity in case the overall shape and/or texture of the objects is overly preserved by previous processing stages. Alternatively, blurring can help with ignoring video noise artifacts which may aid early stages of processing.

Where filtering the series of images at step 202B comprises adjusting an intensity threshold, the code from OpenCV (Open Source Computer Vision) available at https://docs.opencv.org/3.4/d7/d4d/tutorial_py_thresholding.html may be used, this code is incorporated herein by reference. If the image filtering at step 202B comprises blurring the image(s), the code from OpenCV (Open Source Computer Vision) provided at https://docs.opencv.org/3.1.0/d4/d13/tutorial_py filtering.html and incorporated by reference herein may be used. Summing frames may be carried out using the code published by SciPy.org at https://docs.scipy.org/doc/numpy-1.14.0/reference/generated/numpy.sum.html, which is incorporated herein by reference. Difference frames themselves can be calculated using the OpenCV function absdiff available at https://docs.opencv.org/3.0-beta/modules/core/doc/operations_on_arrays.html#absdiff, incorporated herein by reference.

Figure 3:
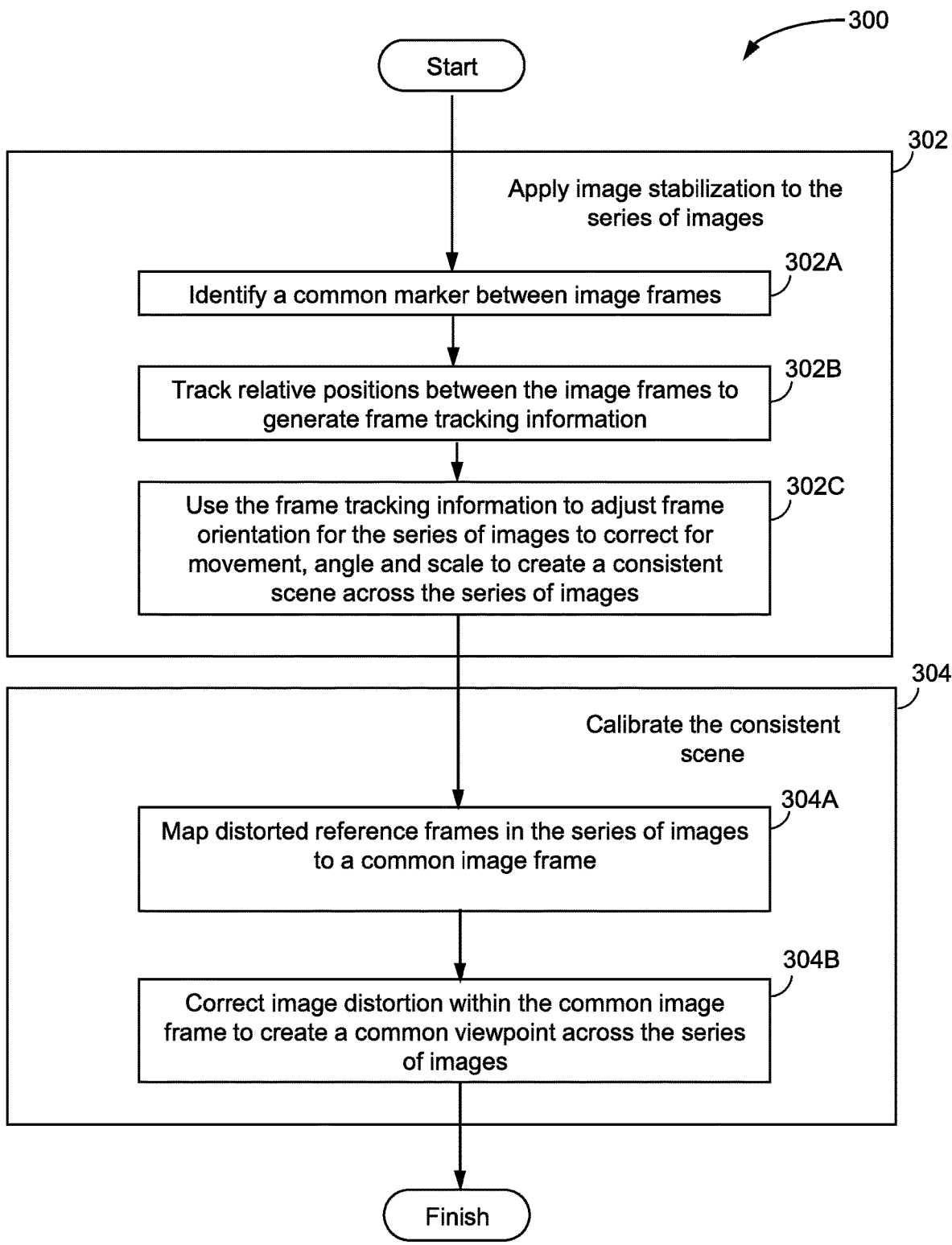
FIG. 3 illustrates a method for applying image preprocessing.

Referring now to FIG. 3, one exemplary method of applying image preprocessing to a series of images is indicated generally by reference 300. At step 302, the method 300 applies image stabilization to the series of images to create a consistent scene, and at step 304 the method 300 calibrates the consistent scene.

In the particular illustrated embodiment shown in FIG. 3, applying image stabilization to the series of images at step 302 comprises identifying a common marker between image frames at step 302A, tracking relative positions between the image frames to generate frame tracking information at step 302B and, at step 302C, using the frame tracking information to adjust frame orientation for the series of images to correct for movement, angle and scale to create a consistent scene across the series of images. Identifying a common marker may comprise locating something in the image that can be consistently identified across many frames (for example, a window on a building). If the image isn't stable, the marker (e.g. window) will be in a different position in each frame. Tracking relative positions between the image frames generate frame tracking information may comprise noting the location of the marker (e.g. window) in each frame, and using the frame tracking information to adjust frame orientation for the series of images to correct for movement, angle and scale to create a consistent scene may comprise shifting each image in a sequence/video so that the marker (e.g. window) remains in the same location across every frame.

In the illustrative embodiment shown in FIG. 3, calibrating the consistent scene at step 304 comprises mapping distorted reference frames in the series of images to a common image frame at step 304A (e.g. to a common rectangle) and correcting image distortion within the common image frame to create a common viewpoint across the series of images at step 304B. Mapping distorted reference frames in the series of images to a common image frame may comprise identifying a floor plane in the original image, which will typically be a skewed/uneven quadrilateral shape from the camera view-point, and mapping the skewed/uneven quadrilateral shape to a corrected rectangular shape. Correcting image distortion within the common image frame to create a common viewpoint may comprise vertical stretching of the image to correct for depth distortion.

Figure 5:
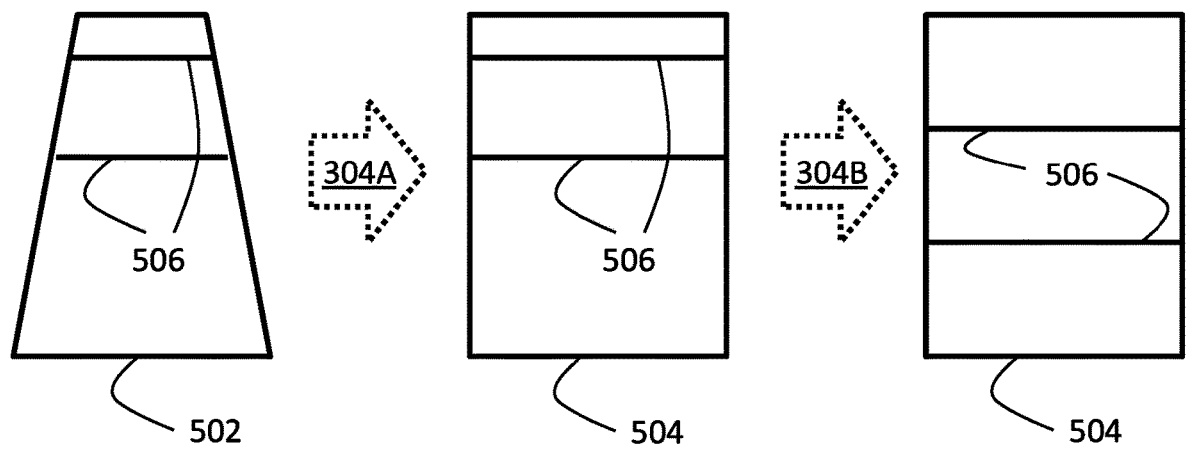
FIG. 5 illustrates calibrating a consistent scene by mapping distorted reference frames in a series of images to a common image frame and correcting image distortion within the common image frame to create a common viewpoint across the series of images.

Referring now to FIG. 5, a horizontally-lined roadway appears to be a converging trapezoid 502 from the camera viewpoint due to perspective. Mapping distorted reference frames in the series of images to a common image frame at step 304A maps the converging trapezoid 502 to a rectangle 504. Correcting image distortion within the common image frame to create a common viewpoint across the series of images at step 304B applies additional vertical stretching to account for the affect of depth on the original camera image by correcting the evenly-spaced horizontal lines 506 that appear unevenly spaced from the camera view point; the lines 506 are evenly spaced after correcting the distortion.

In some exemplary embodiments, aspects of the method 300 can be implemented using code from OpenCV (Open Source Computer Vision) available at https://docs.opencv.org/3.1.0/d1/da0/tutorial_remap.html, and which is incorporated by reference herein.

Optionally, image preprocessing may include motion detection to provide a static background and/or compute a background model by subtracting motion from a series of buffered frames. For example, code from OpenCV (Open Source Computer Vision), may be used in motion detection; this code, which is incorporated by reference herein, is available at https://docs.opencv.org/3.0-beta/modules/core/doc/operations_on_arrays.html#cv2.absdiff. Although this code is for subtraction rather than specifically for motion detection, it can be useful for estimating motion where certain assumptions about the video hold true (e.g. that the lighting is consistent).

Returning to FIG. 2, at step 204, the method 200 applies a sorting algorithm to the image(s) to identify features within the image(s) and classify the features according to at least one predetermined feature category to produce at least one classified feature in the at least one image. The predetermined feature categories are typically categories of features that contain or embody information that needs to be anonymized. Examples of feature categories within an image or images include an entire human individual or at least a portion of a face of a human individual, text matter (e.g. words or phrases), a location identifier (e.g. a landmark building in the background that identifies a particular city, or distinctive portions of a uniform), a brand identifier (e.g. a trademark or logo), an asset identifier (e.g. an internal organizational tracking marker) or other private information. Thus, one predetermined feature category may be "human face" and, where an image included, for example, a face of a human individual, that face could become a classified feature. Likewise, "text matter" may be a predetermined feature category, and where an image includes text matter, the text matter could become a classified feature. These are merely illustrative examples and are not limiting.

A wide range of sorting algorithms may be applied at step 204, depending on the feature(s) that are to be categorized. For example, step 204 may apply one or more of sorting by line crossing, sorting by entering a target zone, sorting by exiting a target zone, sorting by size, sorting by symbol, sorting by aspect ratio, sorting by shape, sorting by texture, sorting by duration, sorting by speed, sorting by severity and sorting by comparison to pre-existing examples. Sorting by line crossing may be carried out, for example, by detecting when an object crosses over a notional line in the scene in a prescribed direction to a prescribed distance from the line and treating this, or a predetermined number of counted occurrences thereof, as an attribute. Sorting by entering or exiting a target zone may comprise, for example, counting the number of times an object enters and/or exits a predetermined target zone in the scene, or determining dwell time within a predetermined target zone in the scene. Sorting by symbol may comprise, for example, identifying a shape or other distinctive located on the object which helps determine an attribute of the object. Sorting by aspect ratio allows distinctions to be made among objects that may have similar image area but different height-to-width ratios, and can also assist in identifying objects that have been turned on their side. Sorting by duration may include determining dwell time within a predetermined target zone in the scene, or dwell time within a predetermined distance from another known object. Sorting by severity can provide more detail around a condition to determine a ranking or indexing to help with reporting or notifications that relate to the severity of the attribute. Sorting by comparison to pre-existing examples may be accomplished, for example, using supervised learning techniques taught at http://scikit-learn.org/stable/supervised_learning.html#supervised-learning, incorporated herein by reference.

At step 206, the method 200 applies annotations to the image(s) by applying to the image(s) an annotation scheme specifying at least one obscuring annotation type to be applied to at least one corresponding feature category. A wide range of obscuring annotation types can be specified, depending on the contexts. A non-limiting list of examples of obscuring annotation types includes morphological operations, colour changes, size changes, blurring, pixilation, patterns, labels (e.g. size, speed, type, etc.) motion trails, heat maps, as well as removing the feature or rendering the feature invisible within the image. Morphological operations are analogous to a digital version of blurring, although sometimes not as "smooth" as conventional blurring. An example link for OpenCV code for morphological operations can be found at https://docs.opencv.org/3.0-beta/doc/py_tutorials/py_imgproc/py_morphological_ops/py_morphological_ops.html and is incorporated by reference.

Motion trails can be used to show the history of how an object has moved through a space by drawing a line connecting each detected position of the object over time. Heat maps are similar to motion trails. However, instead of connecting positions with lines, positions are tracked/accumulated over time. This allows for a visualization that indicates not only the history of positions, but also provides some indication of how long an object stayed in each location. For example, areas where objects linger are represented as being 'hotter' than other areas.

Thus, for example, at step 206, if "human face" and "text matter" are each a predetermined feature category, the annotation scheme may specify that pixilation is to be applied each human face identified in the image(s) and that blurring is to be applied to each instance of text matter identified in the image(s). The annotation scheme may also specify non-obscuring annotations as well. For example, a label (e.g. "SAFE" and/or "UNSAFE") or colour change (e.g. green tint, yellow tint, red tint) could be applied to a feature in a way that does not obscure the feature. For example, imagery showing a human individual engaged in unsafe behaviour by placing his/her arm too close to a machine may be annotated so as to specify that his/her face is to be pixelated and hence obscured, his/her body is to be tinted red and a text label "UNSAFE" is to be applied near (but not actually obscuring) the arm. Motion trails and/or heat maps may be applied, for example, as obscuring annotations or as non-obscuring annotations, depending on the application.

At step 208, the method 200 modifies the image(s) by, for each classified feature in the image(s) having an annotation indicating that the classified feature is in a feature category corresponding to particular obscuring annotation type to be applied, applying the particular obscuring annotation type to that classified feature in the image(s) so that at least one identifying aspect of that classified feature is obscured within the at least one image. The obscuring annotation type(s) applied to the classified feature(s) are thus those specified in the annotation scheme, e.g. morphological operations, colour changes, size changes, blurring, pixilation, patterns, labels (e.g. size, speed, type, etc.) motion trails, heat maps, removing the feature, rendering the feature invisible, outlining, etc. For example, the annotation scheme may specify that pixilation is to be applied to each human face identified in the image(s) and that blurring is to be applied to each instance of text matter identified in the image(s). Thus, at step 208, any portion(s) of the image(s) which are a classified feature of "human face" would be pixilated, and any portion(s) of the image(s) which are a classified feature of "text matter" would be blurred. As noted above, non-obscuring annotations can also be applied.

Morphological operations may include, for example, those taught by OpenCV (Open Source Computer Vision) and which are incorporated herein by reference and published at https://docs.opencv.org/3.4/d9/d61/tutorial_py_morphological_ops.html. Outlining may be performed using the Canny Edge Detection code published by OpenCV (Open Source Computer Vision) at https://docs.opencv.org/3.1.0/da/d22/tutorial_py_canny.html and which is incorporated herein by reference. Other types of obscuring annotation types may be applied using the drawing functions published by OpenCV (Open Source Computer Vision) at https://docs.opencv.org/3.1.0/dc/da5/tutorial_py_drawing_functions.html and incorporated herein by reference.

The present invention may be embodied within a system, a method, a computer program product or any combination thereof. The computer program product may include a computer readable storage medium or media having computer readable program instructions thereon for causing a processor to carry out aspects of the present technology. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g. light pulses passing through a fiber-optic cable), or electrical signals transmitted through a wire.

It will be understood that the present invention can be implemented by computer readable program instructions. Computer readable program instructions described herein can be downloaded to respective computing/processing devices from a computer readable storage medium or to an external computer or external storage device via a network. Computer readable program instructions for carrying out operations of the present technology may be assembler instructions, instruction-set-architecture (ISA) instructions, machine instructions, machine dependent instructions, microcode, firmware instructions, state-setting data, or either source code or object code written in any combination of one or more programming languages, including an object oriented programming language or a conventional procedural programming language. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to implement aspects of the present technology.

These computer readable program instructions may be provided to a processor of a general purpose computer, special purpose computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
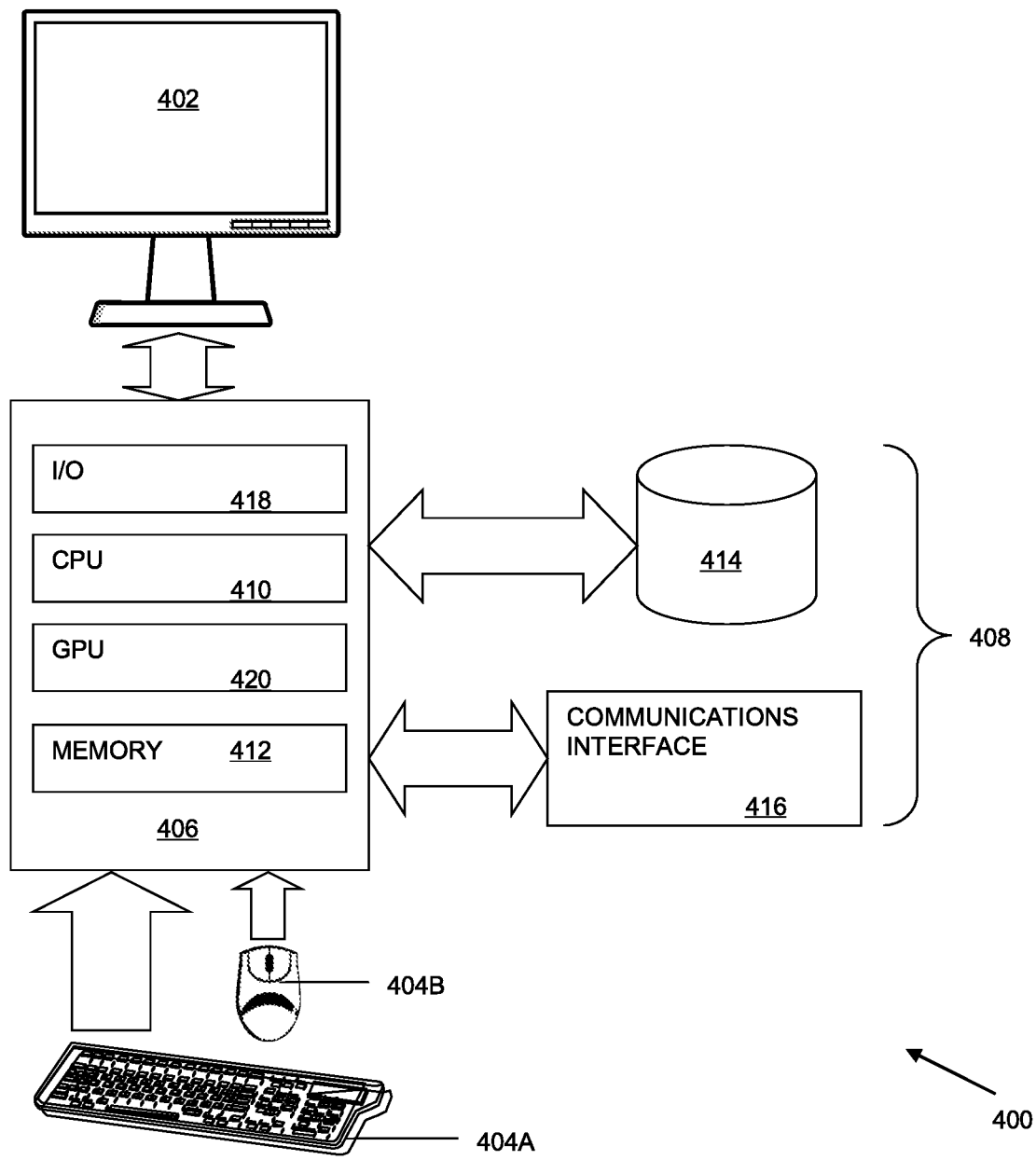
FIG. 4 illustrates an exemplary computer system in respect of which aspects of the present technology may be implemented.

An illustrative computer system in respect of which aspects of the technology herein described may be implemented is presented as a block diagram in FIG. 4. The illustrative computer system is denoted generally by reference numeral 400 and includes a display 402, input devices in the form of keyboard 404A and pointing device 404B, computer 406 and external devices 408. While pointing device 404B is depicted as a mouse, it will be appreciated that other types of pointing device, or a touch screen, may also be used.

The computer 406 may contain one or more processors or microprocessors, such as a central processing unit (CPU) 410. The CPU 410 performs arithmetic calculations and control functions to execute software stored in an internal memory 412, preferably random access memory (RAM) and/or read only memory (ROM), and possibly additional memory 414. The additional memory 414 may include, for example, mass memory storage, hard disk drives, optical disk drives (including CD and DVD drives), magnetic disk drives, magnetic tape drives (including LTO, DLT, DAT and DCC), flash drives, program cartridges and cartridge interfaces such as those found in video game devices, removable memory chips such as EPROM or PROM, emerging storage media, such as holographic storage, or similar storage media as known in the art. This additional memory 414 may be physically internal to the computer 406, or external as shown in FIG. 4, or both.

The computer system 400 may also include other similar means for allowing computer programs or other instructions to be loaded. Such means can include, for example, a communications interface 416 which allows software and data to be transferred between the computer system 400 and external systems and networks. Examples of communications interface 416 can include a modem, a network interface such as an Ethernet card, a wireless communication interface, or a serial or parallel communications port. Software and data transferred via communications interface 416 are in the form of signals which can be electronic, acoustic, electromagnetic, optical or other signals capable of being received by communications interface 416. Multiple interfaces, of course, can be provided on a single computer system 400.

Input and output to and from the computer 406 is administered by the input/output (I/O) interface 418. This I/O interface 418 administers control of the display 402, keyboard 404A, external devices 408 and other such components of the computer system 400. The computer 406 also includes a graphical processing unit (GPU) 420. The latter may also be used for computational purposes as an adjunct to, or instead of, the CPU 410, for mathematical calculations.

The various components of the computer system 400 are coupled to one another either directly or by coupling to suitable buses.

The terms "computer system", "data processing system" and related terms, as used herein, are not limited to any particular type of computer system and encompasses servers, desktop computers, laptop computers, networked mobile wireless telecommunication computing devices such as smartphones, tablet computers, as well as other types of computer systems.

Thus, computer readable program code for implementing aspects of the technology described herein may be contained or stored in the memory 412 of the computer 406, or on a computer usable or computer readable medium external to the computer 406, or on any combination thereof.

As can be seen from the above description, the technology described herein represents significantly more than merely using categories to organize, store and transmit information and organizing information through mathematical correlations. The technology is in fact an improvement to the technology of anonymizing at least one feature in a scene, as it can automatically produce an anonymized scene, and does so using a specific automated procedure which is different from the way a human would perform the same task. As such, the technology is confined to computer-implemented feature anonymization applications. Moreover, the present technology facilitates the specific benefit that no human needs to see the feature being anonymized, which would be required in a manual process (i.e. at least the human performing the anonymizing would see the non-anonymized feature).

While certain open source software packages have been described as useful in implementing certain aspects of the present invention, it is to be understood that the present invention, as claimed, is directed not to any single step which may be known in the art, but to an inventive combination of steps producing the novel and useful result of automatically anonymizing at least one feature in a scene.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation. In construing the claims, it is to be understood that computer-implementation of the present technology is essential.

What is claimed is:

1. A computer-implemented method of anonymizing at least one feature in a scene, the method comprising:
   receiving at least one image representing the scene;
   applying a sorting algorithm to the at least one image to identify features within the at least one image and classify the features according to at least one predetermined feature category to produce at least one classified feature in the at least one image;
   applying annotations to the at least one image by applying to the image an annotation scheme specifying at least one obscuring annotation type to be applied to at least one corresponding feature category;
   modifying the at least one image by, for each classified feature in the at least one image having an annotation indicating that said classified feature is in a feature category corresponding to particular obscuring annotation type to be applied, applying the particular obscuring annotation type to that classified feature in the at least one image so that at least one identifying aspect of that classified feature is obscured within the at least one image,
   wherein the at least one image is a sequential series of images;
   before applying the sorting algorithm, applying image preprocessing to the series of images;
   wherein the sorting algorithm is applied to the series of images after pre-processing the series of images,
   wherein applying image preprocessing to the series of images comprises: applying image stabilization to the series of images;
   calibrating a consistent scene,
   wherein applying image stabilization to the series of images comprises: identifying a common marker between image frames;
   tracking relative positions between the image frames to generate frame tracking information; and
   using the frame tracking information to adjust frame orientation for the series of images to correct for movement, angle and scale to create the consistent scene across the series of images.

2. The method of claim 1, wherein calibrating the consistent scene comprises:
   mapping distorted reference frames in the series of images to a common image frame; and
   correcting image distortion within the common image frame to create a common viewpoint across the series of images.

3. The method of claim 1, further comprising:
   before applying the sorting algorithm, filtering the at least one image;
   wherein the sorting algorithm is applied to the series of images after filtering the at least one image.

4. A data processing system configured for computer-implementation of a method for of anonymizing at least one feature in a scene, comprising:
   at least one processing unit;
   a memory coupled to the at least one processing unit;
   the memory containing instructions which, when executed by the at least one processing unit, cause the at least one processing unit to:
   receive at least one image representing the scene;
   apply a sorting algorithm to the at least one image to identify features within the at least one image and classify the features according to at least one predetermined feature category to produce at least one classified feature in the at least one image;

apply annotations to the at least one image by applying to the image an annotation scheme specifying at least one obscuring annotation type to be applied to at least one corresponding feature category; and modify the at least one image by, for each classified feature in the at least one image having an annotation indicating that said classified feature is in a feature category corresponding to particular obscuring annotation type to be applied, applying the particular obscuring annotation type to that classified feature in the at least one image so that at least one identifying aspect of that classified feature is obscured within the at least one image, wherein the at least one image is a sequential series of images, wherein the instructions, when executed by the at least one processing unit, further cause the at least one processing unit to: before applying the sorting algorithm, apply image preprocessing to the series of images;

wherein the sorting algorithm is applied to the series of images after pre-processing the series of images, wherein the image preprocessing comprises:

applying image stabilization to the series of images;

calibrating a consistent scene, wherein the image stabilization comprises: identifying a common marker between image frames;

tracking relative positions between the image frames to generate frame tracking information; and using the frame tracking information to adjust frame orientation for the series of images to correct for movement, angle and scale to create the consistent scene across the series of images.

5. The data processing system of claim 4, wherein calibrating the consistent scene comprises:

mapping distorted reference frames in the series of images to a common image frame; and correcting image distortion within the common image frame to create a common viewpoint across the series of images.

6. The data processing system of claim 4, wherein the instructions, when executed by the at least one processing unit, further cause the at least one processing unit to:

before applying the sorting algorithm, filter the at least one image;

wherein the sorting algorithm is applied to the series of images after filtering the at least one image.

7. A computer-program product comprising a non-transitory computer readable medium embodying computer-usable instructions which, when executed by at least one processor of at least one computer, cause the at least one computer to anonymize at least one feature in a scene by:

receiving at least one image representing the scene;

applying a sorting algorithm to the at least one image to identify features within the at least one image and classify the features according to at least one predetermined feature category to produce at least one classified feature in the at least one image;

applying annotations to the at least one image by applying to the image an annotation scheme specifying at least one obscuring annotation type to be applied to at least one corresponding feature category;

modifying the at least one image by, for each classified feature in the at least one image having an annotation indicating that said classified feature is in a feature category corresponding to particular obscuring annotation type to be applied, applying the particular obscuring annotation type to that classified feature in the at least one image so that at least one identifying aspect of that classified feature is obscured within the at least one image, wherein the at least one image is a sequential series of images, wherein the instructions, when executed by the at least one processor of the at least one computer, further cause the at least one computer to:

before applying the sorting algorithm, apply image preprocessing to the series of images; wherein the sorting algorithm is applied to the series of images after pre-processing the series of images, wherein applying image preprocessing to the series of images comprises: applying image stabilization to the series of images;

calibrating a consistent scene, wherein applying image stabilization to the series of images comprises: identifying a common marker between image frames;

tracking relative positions between the image frames to generate frame tracking information; and using the frame tracking information to adjust frame orientation for the series of images to correct for movement, angle and scale to create the consistent scene across the series of images.

8. The computer-program product of claim 7, wherein calibrating the consistent scene comprises:

mapping distorted reference frames in the series of images to a common image frame; and correcting image distortion within the common image frame to create a common viewpoint across the series of images.

9. The computer-program product of claim 7, wherein the instructions, when executed by the at least one processor of the at least one computer, further cause the at least one computer to:

before applying the sorting algorithm, filter the at least one image;

wherein the sorting algorithm is applied to the series of images after filtering the at least one image.

* * * * *